United States Patent [19]

Brown

[11] Patent Number: 4,497,988
[45] Date of Patent: Feb. 5, 1985

[54] HANDLEBAR SWITCH

[76] Inventor: Peter K. Brown, P.O. Box 155, Williams, Ariz. 86046

[21] Appl. No.: 432,336

[22] Filed: Dec. 13, 1982

[51] Int. Cl.³ .......................... H01H 9/06; B62J 3/00
[52] U.S. Cl. ................................ 200/61.85; 335/205; 340/134
[58] Field of Search ............ 200/16 A, 52 R, 61.58 R, 200/61.85, 157; 335/205, 207; 340/134

[56] References Cited

U.S. PATENT DOCUMENTS 4,174,473  11/1979  Brenneman ................. 200/61.85 X
4,213,513   7/1980  Beck ........................... 200/16 A X Primary Examiner—J. R. Scott
Attorney, Agent, or Firm—Cahill, Sutton & Thomas

[57] ABSTRACT

A handlebar switch is disclosed having a thin, flat, circular switch body with a centrally disposed opening therein to accomodate the handlebar. The switch body includes a removable segment to permit, when removed, the handlebar of a motorcycle to be inserted in the opening. The switch body includes a pair of cavities, the first of which contains a magnetically operable reed switch and the second of which houses a permanent magnet. The permanent magnet is mounted on an arm that is movable within the cavity and which extends outwardly from the cavity through a slot in the periphery of the circular switch body. Movement of the arm causes the permanent magnet to move closer or further away from the magnetically operable reed switch thus resulting in the opening and closing of the reed switch.

11 Claims, 5 Drawing Figures

HANDLEBAR SWITCH

BACKGROUND OF THE INVENTION

1. Field of the Invention

The present invention relates to switches and more particularly to switches of the type to be mounted on handlebars of vehicles such as motorcycles.

2. Description of the Prior Art

Motorcycle switches to operate headlights, turn signals, and horns have generally been standardized. These switches are typically mounted in a housing immediately adjacent the grip of the left handlebar such that the operator's thumb can conveniently operate the high/low beam switch of the headlights as well as operate the left/right turn signal and the horn.

Motorcycles have only a single headlight that, while adequate in most city driving environments, can be very limiting and in some instances dangerous when driving in rural areas or in mountainous terrain with curving roads. The single motorcycle headlight is also deficient in those instances where heavy rain or fog dictate the utilization of a downwardly aimed light or colored light such as a fog lamp. Obviously, since the motorcycle has only a single headlight, the light cannot provide the type of color desirable for driving in fog nor can the light be aimed downwardly to prevent distracting and dangerous reflections of the light into the operator or driver's eyes.

To overcome the above deficiencies, owners of motorcycles used in those environments frequently resort to auxiliary driving lights or fog lights mounted in a variety of locations on the front of the motorcycle. In order to properly provide switching for these auxiliary lamps, conventional automotive switches are frequently mounted in a variety of locations on the motorcycle frame, handlebar, or fairing. While the position of such switches obviously permits the auxiliary lights to be turned on and off, it is almost always necessary for the operator to remove his left hand from the grip of the handlebar to operate the auxiliary light switch. In those instances where the auxiliary lights are required, the operator must therefore remove his hand from the grip and operate the auxiliary light switch while attempting to maintain directional stability and continue concentration on the traffic and road conditions. Frequently, when auxiliary driving lights are on, it is necessary for the lights to be turned off to accommodate oncoming traffic. In those instances, particularly if the lights of the oncoming traffic distract the motorcycle operator, the requirement that the operator release his grip to find and operate the auxiliary lamp light switch presents a safety hazard.

OBJECTS OF THE INVENTION

It is therefore an object of the present invention to provide a handlebar switch that may be positioned to permit the operator to actuate the switch without removing his hand from the handlebar grip.

It is another object of the present invention to increase the safety of operation of a handlebar switch by conveniently locating this switch without altering the handlebar or the factory installed lighting and horn switches.

It is still another object of the present invention to provide a handlebar switch that may conveniently be mounted without special tools and which will permit a motorcycle owner to mount auxiliary lights on the motorcycle without altering the electrical system of the motorcycle connected to the head light, turn signals, tail lights, or horn.

Still another object of the present invention to provide a handlebar switch that may be manufactured inexpensively while providing a rugged, moisture-proof switch assembly that can conveniently and quickly be mounted on a motorcycle handlebar.

These and other objects of the present invention will become apparent to those skilled in the art as the description thereof proceeds.

SUMMARY OF THE INVENTION

The present invention achieves the above objects through the utilization of a handlebar switch incorporating a thin, flat, circular switch body having a centrally disposed opening therein to accommodate the motorcycle handlebar. To permit the switch body to be mounted on the handlebar, the body is segmented with a section thereof being removable to permit the body to be placed over the handlebar and then secured relative thereto. The switch body incorporates a first cavity containing a magnetically operable reed switch positioned close to one wall of the cavity, and also incorporates the necessary circuitry such as resistive components for proper operation of the switch as will be described more fully hereinafter. A lamp is also provided on the switch body and is connected to the electrical circuitry in the first cavity by a pair of conductors extending into the cavity. The electrical components within the first cavity are hermetically sealed through the utilization of any conventional potting compound readily available on the market.

A second cavity is provided in the switch body in which an arm is movably secured; a permanent magnet is mounted on the arm and is thus itself movable with the arm from a position remote to a position near the wall separating the first and second cavities. Thus, movement of the arm, and the permanent magnet attached thereto, results in the opening and closing of the magnetically operable reed switch.

BRIEF DESCRIPTION OF THE DRAWINGS

The present invention may readily be described by reference to the accompanying drawings in which.

DETAILED DESCRIPTION OF A PREFERRED EMBODIMENT

Figure 1:
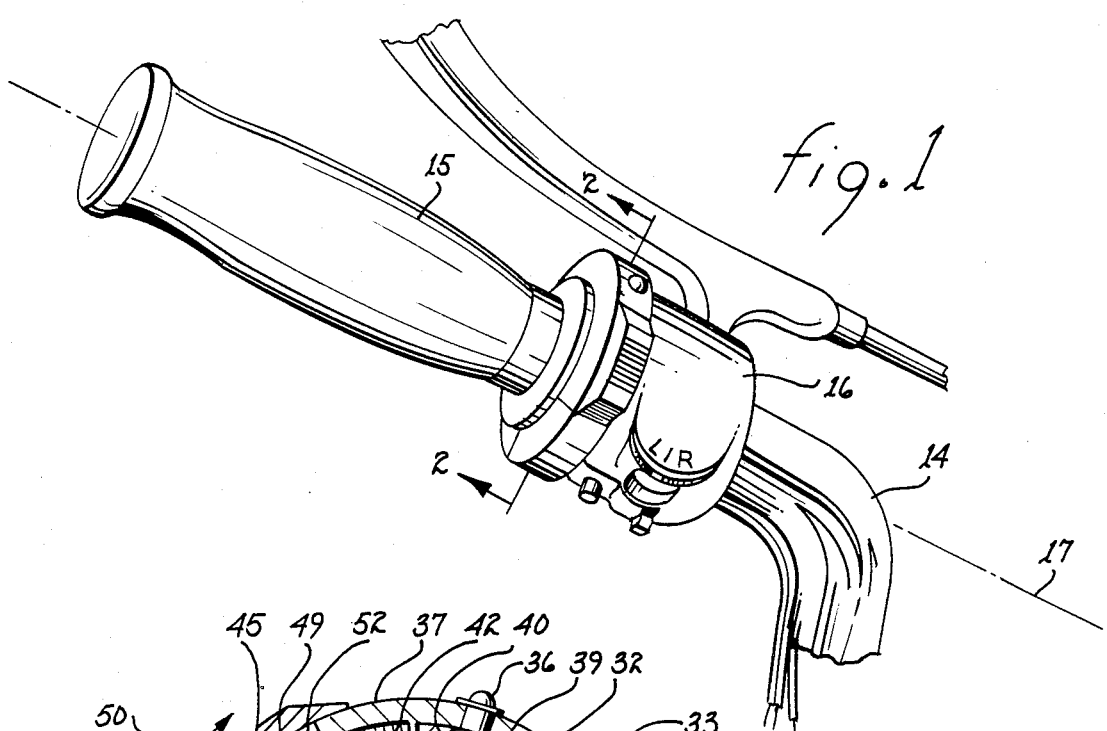
FIG. 1 is a perspective view of a motorcycle handlebar grip showing the positioning of the switch of the present invention.

Referring now to FIGS. 1, 2, 4 and 5, the switch of the present invention includes a thin, flat circular switch body 10 having a centrally disposed opening 12 therein to accommodate the motorcycle handlebar 14. It may be seen that the shape of the switch body permits the switch to be mounted immediately adjacent the handlebar grip 15 and between the handlebar grip and the factory installed headlight turn signal and horn switches 16. In this manner, the operator can conveniently operate the auxiliary light switch in the identical manner that he would operate the factory installed light switches. It is important that the switch be sufficiently thin so as not to force the operator's thumb further from the standard factory switches while the switch diameter must not be too large or it would interfere with the operator's thumb when it reaches over the auxiliary light switch to operate one of the standard motorcycle light switches. Thus, the switch body 10, when mounted on a handlebar 14 should have a ratio of thickness (measured parallel to the longitudinal axis 17 of the handlebar) to width (measured perpendicular to the longitudinal axis of the handlebar) of from 0.5 to 0.06 and preferably approximately 0.17. In a particular embodiment chosen for manufacture, it has been found that a thickness of 0.42 inches, and a diameter of 2.455 inches is ideal.

The switch body 10 includes a removable segment 20 that is attached to the remainder of the switch body by a pair of fastening means such as screws 22 and 23 that extend through channels 24 and 25 respectively and threadedly engage the remainder of the switch body. The segment 20 is removed and the switch body 10 placed over the handlebar 14 at the appropriate location and the segment replaced. Since motorcycle handlebars are generally available in two distinct tube diameters, an insert ring 27 is provided that may be used for the smaller diameter handlebar or may be removed to accommodate a larger diameter handlebar. When the switch body has been appropriately positioned on the handlebar, a clamping screw 29 may be tightened against the bar to prevent the switch body from rotating about the bar.

A first cavity 30 is molded into the switch body and encloses a magnetically operable reed switch 32. The reed switch is electrically connected, together with a pair of resistors 33 and 34 (to be described more fully hereinafter) and secured within the cavity by potting. Potting compounds are well known and need not be described here. For example, conventional epoxy potting compounds can be used to substantially fill the cavity and thereby encase the electrical components therein.

A lamp 36 is mounted on the periphery 37 of the switch body and is energized through a pair of conductors 39 and 40 extending through the periphery 37 into the cavity 30. The lamp 36 can be any well known low-power-drain electric lamp such as a conventional light emitting diode (LED). A second cavity 42 is molded in the switch body and is positioned adjacent the first cavity 30. It may be noted that the first and second cavities may be defined or separated by only the potting compound of the electrical circuit components in the first cavity and that it may not be necessary to actually mold two separate cavities in the switch body. In other words, it may be possible to mold a single large cavity in the switch body and then rely upon the potting compound to divide the cavity into a first and second cavities. However, the description herein will refer to first and second cavities each molded in the switch body.

An arm 45 is positioned in the second cavity 42 and is slidable therein. The arm extends outwardly of the switch body and terminates in a thumb piece 47. It may be noted that the arm extends through an arcuate slot 49 in the periphery of the switch body and is therefor free to move toward and away from the reed switch as indicated by the arrow 50. It may also be noted that the thumb piece 47 incorporates an arcuate surface 52 adjacent and in contact with the peripheral surface 37 of the switch body 10 to cover the arcuate slot 49.

A permanent magnet 55 is mounted on the arm 45 and oriented such that when it is moved, through movement of the arm, toward the reed switch, the reed switch is actuated. It may thus be seen that movement of the thumb switch 55 toward the right as viewed in FIG. 2 will result in the movement of the permanent magnet to the proximity of the magnetically operable reed switch 32 resulting in the actuation of the latter. The reverse movement of the thumb piece will cause the reverse to occur.

Figure 3:
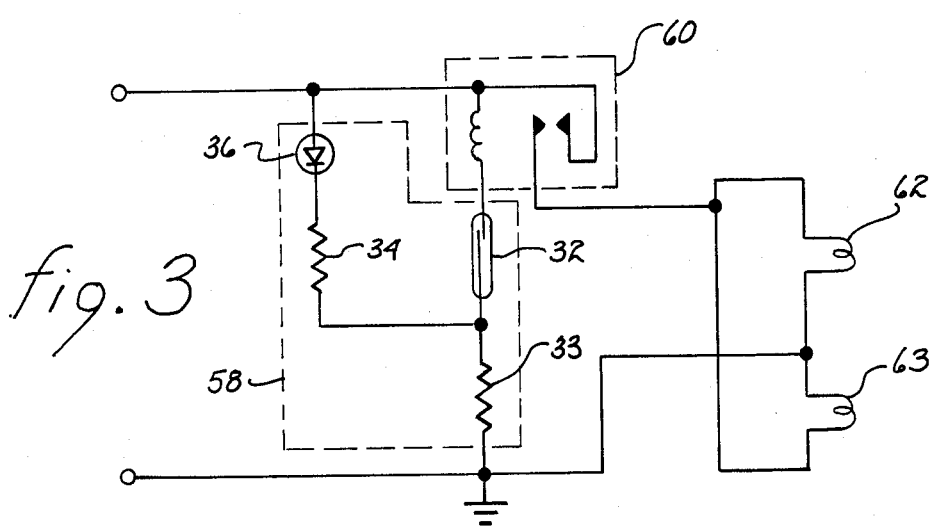
FIG. 3 is a schematic circuit diagram of a typical electrical circuit showing the incorporation of the switch of the present invention in an auxiliary lighting circuit.
Figure 4:
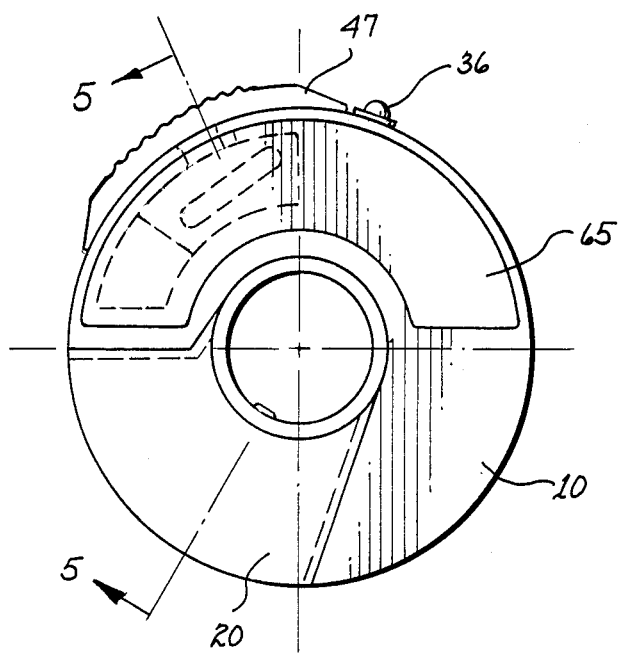
FIG. 4 is a side elevational view of the switch of the present invention.
Figure 5:
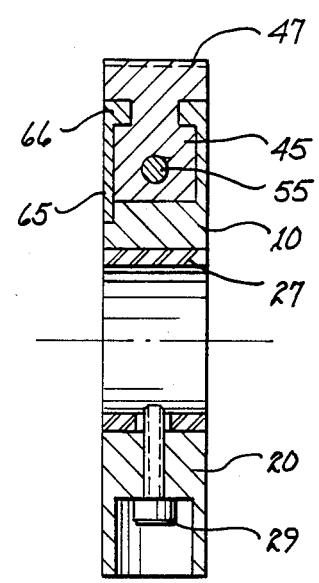
FIG. 5 is a cross-sectional view of FIG. 4 taken along lines 5—5.

Referring to FIG. 3, that portion of the circuitry incorporated within the first cavity of the switch body 10 is enclosed within broken lines 58. It may be seen that the closure of the reed switch 32 results in the application of an appropriate voltage to a conventional automotive-type voltage relay 60, thus closing the contacts thereof and ultimately resulting in the application of battery voltage to the auxiliary driving lights 62 and 63. Closure of the reed switch also results in the application of appropriately reduced voltage to the light emitting diode 36. In this manner, closure of the reed switch and the actuation of the relay results in the energization of the auxiliary driving lights while presenting an indication to the operator of the fact that the auxiliary driving lights are on. Keeping in mind the circuit diagram of FIG. 3, the mounting and operation of the switch of the present invention will now be described.

The switch body 10 is first positioned on the handlebar 14 by removing the removable segment 20 and appropriately removing (or permitting to remain) the split ring insert 27 to thus permit the body to fit against the handlebar. The removable segment is then replaced and the screws 22 and 23 are tightened. It may be noted that the dimensions of the switch body permit the switch to be mounted immediately adjacent the handlebar grip 15 and between the grip and the factory installed turn, head light, and horn switches 16. The switch body is rotated so that the thumb piece 47 is conveniently positioned to permit the left thumb to operate the thumb piece without requiring the operator to change the position of his hand on the grip. The switch body is then clamped in place by tightening the clamping screw 29. The electrical conductors are positioned along the handlebar as shown in FIG. 1 and are connected to a conventional automotive type relay as shown in FIG. 3. It is contemplated that the switch of the present invention will be provided with convenient and conventional connectors for the connection of the three conductors to the remaining elements of the circuit.

Figure 2:
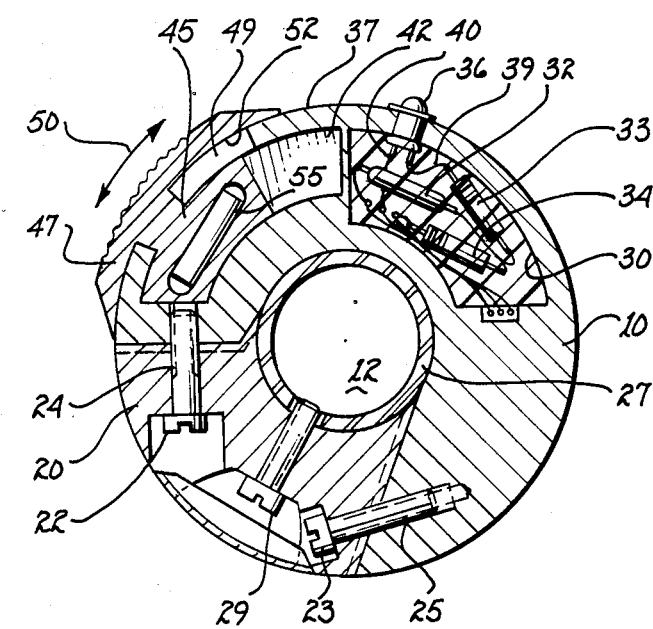
FIG. 2 is a cross-sectional view of the switch shown in FIG. 1 taken along line 2—2.

When it is desired to energize the auxiliary lights, the thumb piece is moved to the right as viewed in FIG. 2 thus causing the permanent magnet 55 to approach the reed switch 32 and cause the latter to close. When the reed switch closes, current is provided to the lamp 36 thus giving an indication to the operator that the auxiliary driving lights are on. Concurrently, the relay completes the electrical circuit to the auxiliary driving lights.

It may be noted that the electrical components in the cavity in the switch body are completely hermetically sealed and are encased in such a manner that the electrical components therein are prevented from independently moving and thereby possibly causing damage through vibration or impact. The positioning of the magnetically operable reed switch is very important and it must be maintained in a position that permits it to be easily operated through the proximity of the permanent magnet.

The arm 45 connected to the thumb piece 47 is movable in a generally arcuate path to swing the permanent magnet into the proximity of the reed switch and cause the latter to close. Opposite movement of the thumb piece results in the removal of the permanent magnet from the vicinity of the reed switch causing the latter to open. It may be noted that there are no springs or other components associated with the thumb piece which would tend to reduce the reliability of the switch and increase its cost. The switch body, as well as the removable segment, may conveniently be molded from any of a large number of available plastic materials using conventional molding techniques. The cavities, after the potting of the electrical components and the positioning of the arm and permanent magnet, are closed through the utilization of the closure plate 65. The plate 65 may be staked or cemented in place to provide proper closure to the cavities. The closure plate may also be provided with a lip 55 that forms one side of the arcuate slot to act, in combination with the remaining surfaces of the slot, as a guide during movement of the arm.

I claim:

1. A switch for mounting about the longitudinal axis of a handlebar comprising:
   a. a thin, flat, switch body having an opening passing therethrough to accomodate a handlebar; said body, when mounted on a handlebar, having a ratio of thickness measured parallel to the longitudinal axis of said handlebar, to width measured perpendicular to the longitudinal axis of said handlebar of from 0.5 to 0.06, and preferably approximately 0.17;
   b. said body having a removable segment to permit, when removed, said handlebar to be inserted in said opening, said body encircling said handlebar when said segment is replaced;
   c. means defining a cavity in said body;
   d. a magnetically operable reed switch mounted in said cavity;
   e. sealing means for hermetically sealing said cavity;
   f. a permanent magnet movably mounted in said body adjacent said cavity; and
   g. means for moving said permanent magnet and reed switch toward and away from each other to cause said reed switch to open and close.

2. The combination set forth in claim 1 wherein said permanent magnet is mounted in an adjacent cavity in said switch body.

3. The combination set forth in claim 1 wherein said sealing means comprises a potting compound substantially filling said cavity and encasing said reed switch.

4. The combination set forth in claim 1 wherein said means for moving said permanent magnet and said reed switch toward and away from each other comprises a movable arm secured to said magnet extending outwardly from said switch body.

5. The combination set forth in claim 4 wherein said switch body includes at least a portion of its outer surface arcuately shaped and wherein said arm terminates in a thumb piece having an arcuate surface adjacent and parallel to said arcuately shaped outer surface.

6. The combination set forth in claims 4 or 5 wherein said sealing means comprises a potting compound substantially filling said cavity and encasing said reed switch.

7. The combination set forth in claim 1 wherein said removable segment is secured to said body by a plurality of fastening means threadedly engaging said body and passing through channels provided therefor in said segment.

8. A switch for mounting about the longitudinal axis of a handlebar comprising:
   a. a thin, flat, switch body having a centrally disposed opening therein to accomodate a handlebar; said body, when mounted on a handlebar having a ratio of thickness measured parallel to the longitudinal axis of said handlebar, to width measured perpendicular to the longitudinal axis of said handlebar of from 0.5 to 0.06 and preferably approximately 0.17;
   b. said body having a removable segment to permit, when removed, said handlebar to be inserted in said opening, said body encircling said handlebar when said segment is replaced;
   c. means defining cavity in said body;
   d. means defining an opening in the periphery of said switch body communicating with said cavity;
   e. a lamp mounted in said opening and having conductors leading therefrom to said cavity;
   f. a magnetically operable reed switch mounted in said cavity;
   g. hermetic sealing means in said cavity encasing said reed switch and any circuit components in said cavity;
   h. means defining a slot along the periphery of said switch body communicating with said cavity;
   i. a permanent magnet mounted on an arm positioned in said cavity, said arm extending outwardly of said cavity through said slot and movable along said slot to thereby move said magnet toward and away from said reed switch; and
   j. a thumb piece positioned on the outside of switch body and secured to said arm, said thumb piece having a surface adjacent the periphery of said switch body covering said slot.

9. The combination set forth in claim 8 wherein said removable segment is secured to said body by a plurality of fastening means threadedly engaging said body passing through channels provided therefor in said segment.

10. A switch for mounting about the longitudinal axis of a handlebar comprising
    a. a thin, flat, circular switch body having a centrally disposed opening therein to accomodate a handlebar: said body, when mounted on a handlebar, having a ratio of thickness measured parallel to the longitudinal axis of said handlebar, to width measured perpendicularly to the longitudinal axis of said handlebar of from 0.5 to 0.06 and preferably approximately 0.17;
    b. said body having a removable segment to permit, when removed, said handlebar to be inserted in said opening, said body encircling said handlebar when said segment is replaced;
    c. means defining a first cavity in said body;
    d. means defining an opening in the periphery of said circular switch body communicating with first said cavity;

e. a lamp mounted in said opening and having conductors leading therefrom to said first cavity;

f. a magnetically operable reed switch, mounted in said first cavity;

g. hermetically sealing means in said first cavity encasing said reed switch and any circuit components in said cavity;

h. a second cavity adjacent said first cavity;

i. means defining an arcuate slot along the circumference of said circular switch body communicating with said second cavity;

j. a permanent magnet mounted on an arm positioned in said second cavity, said arm extending outwardly of said cavity through said arcuate slot and movable along said slot to thereby move said magnet toward and away from said reed switch; and k. a thumb piece positioned on the outside of said switch body and secured to said arm, said thumb piece having an arcuate surface adjacent the circumference of said arcuate switch body covering said arcuate slot.

11. The combination set forth in claim 10 wherein said removable segment is secured to said body by a plurality of fastening means threadedly engaging said body and passing through channels provided therefor in said segment.

* * * * *